United States Patent
Chang et al.

[15] 3,636,838
[45] Jan. 25, 1972

[54] BEAM MOTION COMPENSATION IN OPTICAL IMAGE TRANSFER SYSTEMS HAVING MOVING PARTS

[72] Inventors: David C. Chang, Pleasant Valley; James Lipp, Poughkeepsie, both of N.Y.

[73] Assignee: International Business Machines Corporation, Armonk, N.Y.

[22] Filed: Apr. 4, 1969

[21] Appl. No.: 813,446

[52] U.S. Cl. ................................95/4.5, 352/113, 340/378
[51] Int. Cl. .................................................B41b 17/12
[58] Field of Search ....................95/4.5; 352/113; 340/378

[56] References Cited

UNITED STATES PATENTS 2,343,397   3/1944   Bryce ..............................352/119 X
3,509,804   5/1970   Kohler ................................95/4.5

*Primary Examiner*—John M. Horan
*Attorney*—Hanifin and Jancin and Robert Lieber

[57] ABSTRACT

A static electro-optic crystal deflection element, subject to electrical control of refraction, is used as an inertialess compensating element in mechanically controlled projection systems for laser beams. Electrical signals derived from the moving parts of the control mechanism are applied to the crystal to produce compensating refractions of the laser coordinated with short increments of movement of the mechanism. In one application blurring effects associated with continuous rotation of a multifaceted deflection mirror in a photographic tracing system are nullified by electro-optic compensation. In another application distortion due to relative motion between a sensing laser and a rotating drum containing a series of hologram records is cancelled by electro-optic effects coordinated with individual record movements.

15 Claims, 11 Drawing Figures

UNCOMPENSATED SMEARING

PARTIAL COMPENSATION ($A_2 \rightarrow$ FIG.5)

NULLIFICATION WITH LONG ($T_X'$) EXPOSURE

NULLIFICATION WITH SHORT ($T_X$) EXPOSURE

INVENTORS
DAVID C. CHANG
JAMES LIPP

BY Robert Lieber

ATTORNEY ns. 3,636,838

BEAM MOTION COMPENSATION IN OPTICAL IMAGE TRANSFER SYSTEMS HAVING MOVING PARTS

BACKGROUND OF THE INVENTION

1. Field of the Invention

The invention relates to elimination of a cause of image smearing and other improvements in optical image transfer apparatus having moving elements in the light transfer path. According to one aspect of the invention mechanically produced long deflections of a beam of light relative to a sensitive surface, in particular deflections of a laser beam relative to unexposed film in a photographic printer, are converted into a series of intermittent short deflections coordinated in timing with image segment (i.e., character image) exposure intervals. The short deflections are controlled by electrical means without inertia, and serve to reduce, or eliminate entirely, motion of the beam relative to the sensitive surface during segment exposure intervals. Consequently, sharper and more intense images are formed at the surface. In another aspect the invention is used to compensate electrically for short-term motion of a holographic medium relative to a light beam which is modulated by the holograms in the medium.

2. Description of the Prior Art

Optical systems for transporting images in discrete segments by means of rotating mirrors or other moving parts arranged in the light transfer path have been exhaustively treated in patents and other published literature. The following references are cited as representative of this treatment:
 a. Proceedings of the IEEE, Vol. 54, No. 10, Oct. 1966, pp. 1,429–1437. "A Television Display Using Acoustic Deflection and Modulation of Coherent Light," A. Korpel et al.
 b. Ibid, pp. 1,437–1,444, "A Survey of Laser Beam Deflection Techniques." V. J. Fowler et al.
 c. IEEE Spectrum Feb. 1968, pp. 45–52, "Electro-Optic Light Beam Deflection," J. F. Lotspeich.
 d. U.S. Pat. No. 3,154,371, W. R. Johnson.
 e. U.S. Pat. No. 3,360,659, C. J. T. Young.

It is our understanding that distortion of optically transferred image segments due to motion in the optical transfer system is usually controlled in such systems by reducing the segment exposure intervals (i.e., reducing shutter opening time) and increasing the energy output of the light source. This however is inefficient and in many instances unacceptable because it imposes unreasonable power demands on the source, and does not eliminate the smearing. Varying the motion of the moving element is unsatisfactory in most systems because of inertial limitations.

The present invention seeks to overcome the foregoing problems without creating new ones. Such objects are achieved by utilizing electrically controlled short displacements of the beam to compensate for the motion of the optics or other moving parts during image segment transfers. By controlling the compensating beam displacements electrically and coordinating such control with the relatively long-term motion of the moving parts of the system image smearing and contrast loss effects are significantly reduced without substantial added dissipation of light energy. Because of these advantages the invention, in effect, permits expansion of the segment exposure intervals in appropriate circumstances whereby image contrast may be enhanced.

Thus, in specific applications described herein—including apparatus for performing nonimpact printing at high speeds by sequential character photography and apparatus for reading discrete hologram records at high speeds—the invention provides a basis for achieving otherwise unattainable image exposure periods and image transfer fidelity from a moderately intense light source in a system with moving parts.

SUMMARY OF THE INVENTION

The invention involves electro-optic compensation for relative motion between a light beam and a moving medium during periods in which a segment of an image formed by the light beam is being transferred relative to the medium. This enhances the definition and contrast of the transferred image and also enables more effective use to be made of the light source energy. In one application motion between a moving reflector and a sensitive device or surface receiving the reflected beam is cancelled during image segment exposure intervals, thereby reducing image smearing and permitting lengthening of image segment exposure intervals. Cancellation is accomplished by short electrical displacements of the beam with, for example, an electro-optic cell. The object of this, as we have indicated previously is to project intensified, more clearly defined and undistorted images with a light source of moderate intensity. This has particular advantage in specific applications; as an example in resolving and intensifying the necessarily brief exposures of a photographic recording medium to the segments of a segmented image formed by a laser beam in a high-speed nonimpact printing process.

In another application disclosed herein the motion of a light beam in relation to a moving medium containing a hologram record is modified by electro-optic means, whereby the light impinging on discrete elements of the moving record is momentarily deflected in order to track the motion of the individual image elements and thereby provide for more accurate detection of the elements.

In both applications above the compensating beam deflections are coordinated with the intervals of beam exposure in such fashion that apparent motion during periods of image exposure between the exposed beam and a particular surface in the beam path is either nullified or significantly reduced. By restricting the compensating deflections to small amplitude excursions the electro-optic means utilized for the purpose introduces minimal light and electrical energy losses into the system in furtherance of the objective of efficiently delivering maximal light energy to the sensitive surface on which the beam finally impinges.

This sensitive surface may, for example, contain a light-sensitive recording medium by which it is desired to produce a high-speed photographic record of an image exposed in segments by the beam and a moving reflector. By enhancing concentration of light energy at the recording medium during individual segment exposures the invention serves to reduce the power required from the light source, and/or to reduce the time required to complete a full image exposure, for little additional cost over a straightforward system utilizing an uncompensated moving reflector.

The foregoing and other features, objects and advantages of the invention will be apparent from the following more particular description of preferred embodiments of the invention as illustrated in the accompanying drawings.

DETAILED DESCRIPTION OF PREFERRED EMBODIMENTS

Figure 1:
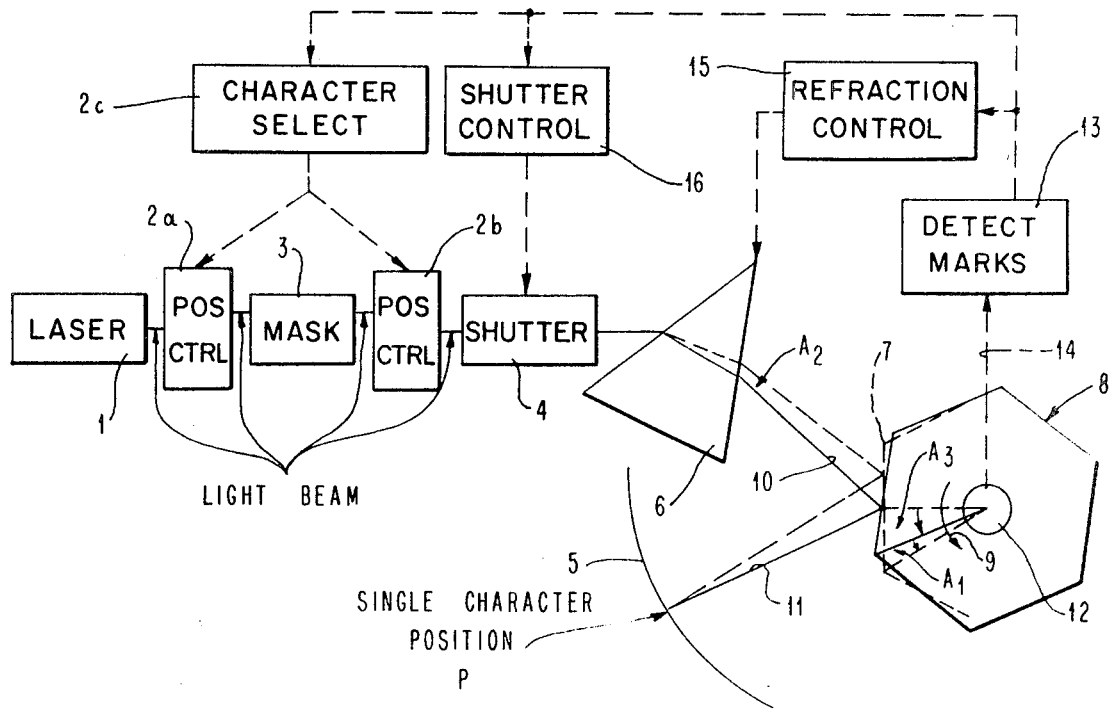
FIG. 1 is a schematic illustration of one optical system embodying the invention.
Figure 7:
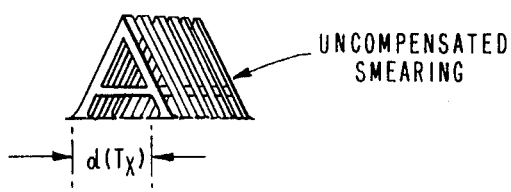
FIGS. 7–10 illustrate the appearance of a single character image projected by the system of FIG. 1 and effects thereon resulting from short counterdeflections of the laser beam and variations in the shutter opening period.
Figure 8:
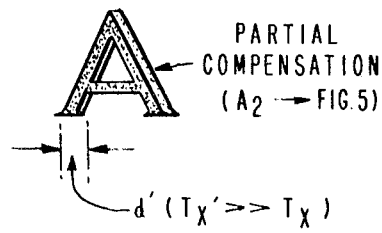

In FIG. 1 a laser source 1 of conventional construction provides a collimated beam of laser light. Position controls 2a, 2b operated by character selection signals supplied from source 2c direct the laser beam through a character image forming mask 3. The masked beam is repositioned by controls 2b and then applied to an electro-optic shutter device 4, also of well-known construction.

In cooperation with the mask 3 and in known fashion the signals from character selection source 2c and position controls 2a, 2b selectively form the beam into a series of character images and present the formed beam to the shutter device 4 in a fixed position. The device 4 then controls the periods of intermittent exposure of sensitive surface 5 to the image-formed beam.

Leaving shutter device 4 the intermittently exposed laser beam passes through a variable refractive device 6 to a reflecting face 7 of a multifaceted mirror 8 illustrated as having six faces. As the mirror rotates in the direction indicated by arrow 9 it transfers incident laser beam 10 as a reflected beam 11 to the surface 5 while deflecting the reflected beam linearly across the surface. As a result the surface 5 becomes exposed to a line of discrete character images selected by source 2c and positioned by coordinated operations of shutter device 4.

The refractive device 6 operates by an electro-optic or magneto-optic effect to produce short counterdeflections of the beam 10 during the shutter exposure periods. Suitable electro-optic deflections are produced, for example by a prism made of potassium dihydrogen phosphate (KDP) crystal with potential differences applied to the crystal surfaces through electrodes affixed in known manner. The counterdeflections nullify motion between beam 11 and surface 5 during character exposure periods. This eliminates or significantly reduces undesirable character image smearing effects at surface 5 whereby longer exposure intervals may be used. With longer exposure intervals the intensity and definition of transferred images is enhanced for a given laser source.

Means linked rotatably to the mirror 8, such as the disc indicated at 12, has precisely spaced reference indicia not shown in the drawing which are detected by suitable means 13 and converted to synchronizing electrical pulses. The indicia may for example be illuminated slits and means 13 may have a photocell for sensing the slits. The synchronizing pulses are used to coordinate character selection and exposure operations of elements 2c, 4, 6 of the system with the mirror rotation. The coupling between detecting means 13 and shaft 12 is suggested schematically by broken line 14.

More specifically the synchronizing pulse output of detector 13 is utilized to control jointly: (a) the timing of compensating beam deflections produced by the electro-optic device 6; (b) the timing of exposure operations of shutter device 4; and (c) the timing of image character selection functions performed jointly by elements 2a, 2b, 2c and 3.

In order to control the amplitude of the compensating beam deflections of device 6 control circuit means 15 is interposed between synchronizing pulse-detecting means 13 and the electrodes of device 6. Circuit 15 provides signals with a waveform discussed in detail below which control the angle of refraction of the cell 6 and hence the compensating deflections of the beam.

For the purpose of controlling the intervals of operation of shutter 4 control circuit means 16 is interposed between detector 13 and shutter 4. The control circuit means 15 and 16 should include delays as needed to coordinate the timing of operations of the respective devices 6 and 4 in accordance with the timing program next described.

The coordinated operations of shutter 4, counterdeflection-controlling device 6 and mirror 8 will now be described with particular reference to timing diagrams 2 through 6. The three angle functions $A_1$, $A_2$, and $A_3$, represented graphically in these figures are shown definitively in FIG. 1. Angle function $A_1$ represents the differential angular displacement in each character interval of the light-receiving face 7 of mirror 8. This corresponds to the differential linear deflection of beam 11 relative to surface 5 during the character interval. Function $A_2$ represents the differential counter displacement of the beam 10 in successive character intervals. Function $A_3$ represents the cumulative rotation of the light-receiving face 7 of mirror 8, or equivalently the total deflection of beam 11, during exposure of a line of character images.

Figure 2:
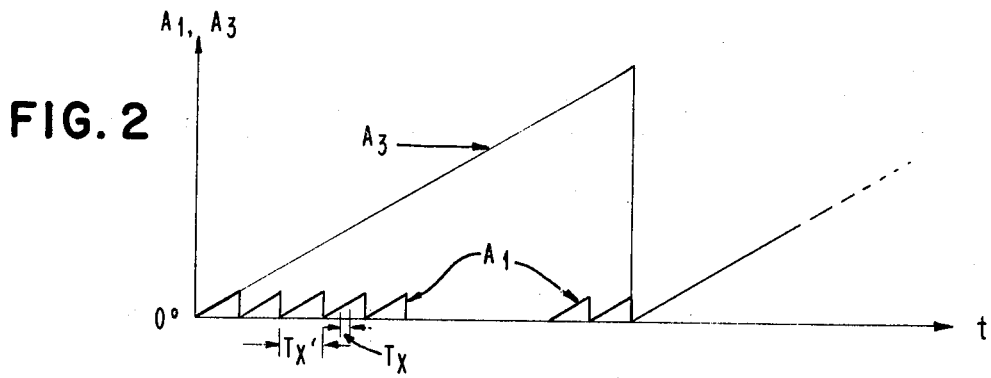
FIGS. 2–6 are waveform diagrams for explaining various aspects of operation of a system such as that shown in FIG. 1.

It will now be seen that $A_1$ will vary linearly with time $t$ and is representable by the sawtooth waveform of FIG. 2. Hence, if $A_2$ is made to vary linearly in time in proportion to $A_1$ but in an opposite sense, as suggested in FIGS. 2 and 3, the position P of beam 11 relative to surface 5 would vary according to the staircase function indicated in FIG. 4. Thus, during each character exposure the beam 11 would be held motionless relative to surface 5 and intermediate successive exposures the beam would step rapidly to its successive exposure positions. Of course it will be understood that if the character to be selected is a blank character the beam would be blanked by the operation of selection controls 2a–2c, and mask 3, and no light would be received at the corresponding position of surface 5.

If $T_x$ represents maximal character exposure time for an uncompensated system and $T_x'$ represents maximal character exposure time with beam motion compensation it is seen (FIG. 2) that $T_x' >> T_x$. Thus it is appreciated that with compensation the exposure of surface 5 may be greatly intensified without changing the laser source.

Figure 4:
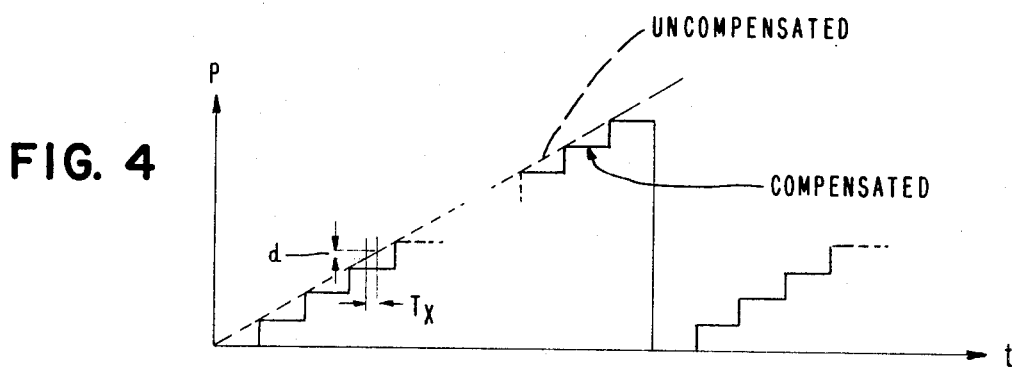
Figure 5:
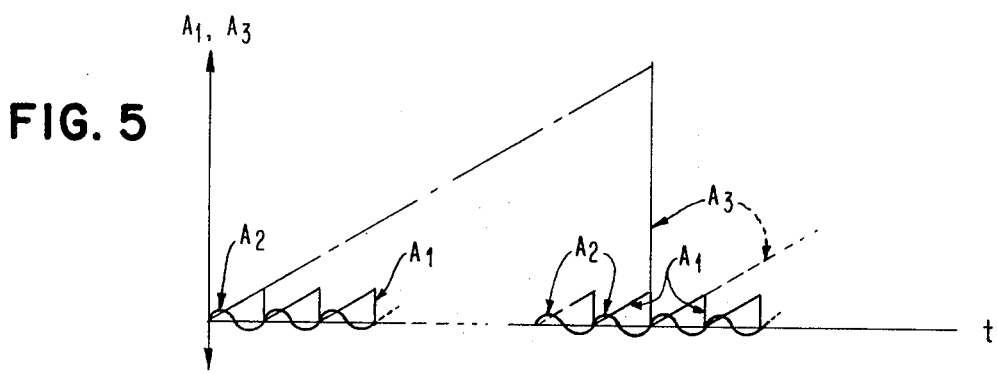
Figure 6:
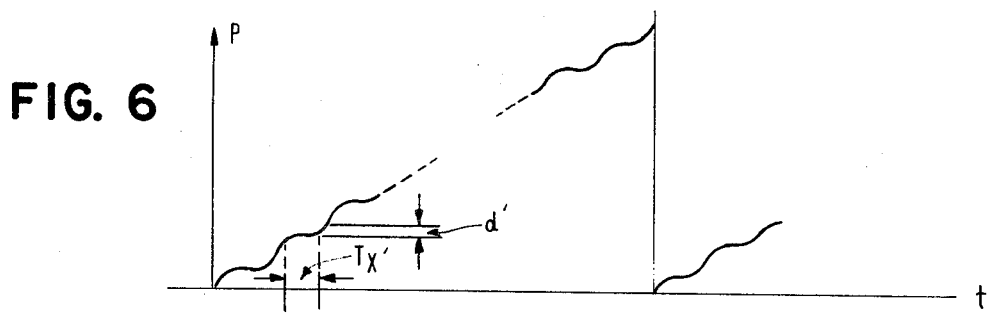

By referring to FIGS. 5 and 6 it may be seen that even if the angle functions $A_1$ and $A_2$ do not exactly complement each other nevertheless a partial cancellation of beam character motion may be achieved. For example, $A_2$ may be varied cyclically according to a sine function as suggested in FIG. 5 and the beam motion $P(t)$ will vary in the nonlinear manner suggested in FIG. 6. Here, the beam moves rapidly at the beginning and end of each character interval and remains virtually motionless during the exposure periods $T_x'$. The small deflection of the beam $d'$ in the exposure intervals $T_x'$ (FIG. 6) should be compared to the deflections $d$ in the much shorter exposure intervals $T_x$ (FIG. 4).

Figure 9:
Figure 10:
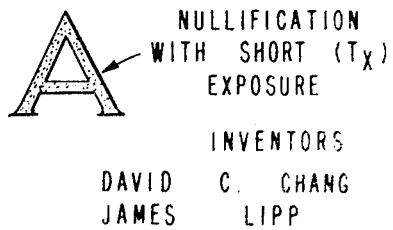

The effects of beam motion during character exposure intervals may be more fully understood by referring to FIGS. 7–10. Without any compensation the beam 11 moves an exaggerated distance $d$, in a given exposure interval $T_x$ established by the operation of the shutter 4, and produces a smeared image (exaggerated view of FIG. 7) of the illustrative character "A." This smearing effect is totally eliminated, as shown in FIG. 9, when a device 6 with linear response is fed by a linearly varying voltage corresponding to the angle function $A_2$ shown in FIG. 3 regardless of the length of the exposure interval. The smearing is reduced considerably (FIG. 8) despite longer exposure intervals $T_x'$, when the device 6 is fed by a sine wave voltage corresponding in timing and amplitude to the function $A_2$ represented in FIG. 5. As indicated by way of contrast in FIGS. 9 and 10 an image produced with full nullification of beam motion may nonetheless have variable intensity or contrast depending upon the period ($T_x'$, $T_x$) of opening of the shutter. Thus, with a short shutter interval (FIG. 10) an image with weak contrast is obtained whereas with a long shutter interval an image with more intense contrast (FIG. 9) is obtained.

Figure 3:
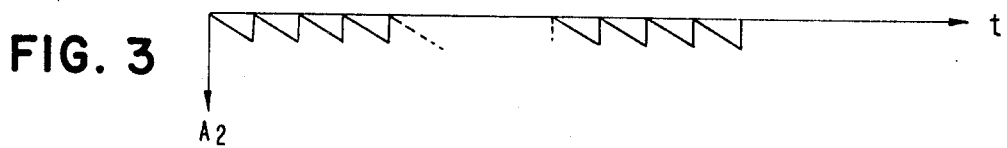

The system just described with the device 6 controlled according to the angle function $A_2$ of FIG. 3 has specific advantages when applied to high-speed nonimpact printing by photographic techniques. Present day objectives of achieving quality printing at exposure rates on the order of 100,000 characters per second, with a laser source of milliwatts power capacity and existing commercial silver halide preparations used as the sensitive medium-covering surface 5, would be extremely difficult if not impossible to attain with uncompensated mechanical deflection of the beam; yet a mechanical deflection system has distinct advantages not the least of which are economy, simplicity and efficiency.

As suggested in FIG. 1 the mirror faces 7 and the surface 5 should be conformally adapted in geometry to assure sharp focusing of the beam at the surface throughout the long deflection range defined by the rotation of each light-receiving face of the mirror.

It will also be understood that a character-printing system as just described may be adapted to reproduce pictorial images other than discrete characters or symbols by disablement of the character selection controls and substitution of other manipulations of the laser beam by which the desired pictorial image is formed; preferably in discrete segments. In such working the laser beam may be exposed through the shutter device 4 and the motion-compensating electro-optic cell 6 as in character image exposures provided that the image is projected in segments. The compensating variations of cell 6 should then be coordinated with the mirror rotation and shutter operation as in the character motion compensation previously described.

At this point a few observations are appropriate concerning the utility of the invention in achieving nonimpact printing at high speeds. At high character exposure rates on the order of 100,000 characters per second only a few microseconds of time are available to complete a character exposure and in the overall character-timing period of 10 microseconds the beam must deflect over a not inconsiderable distance corresponding to the space between character centers; for example over a distance of one-sixteenth inch. Thus the beam must deflect over the surface 5 at very high speeds of thousands of inches per second.

In order to control image smearing and loss of definition due to such rapid beam motion it is not sufficient to employ the conventional expedient of shortened beam sampling or exposure periods. This only reduces further the already small amount of light energy reaching the sensitive medium 5 and causes additional problems relative to image definition and resolution. Increasing the energy output of the laser source to compensate for shortened exposures would be inefficient, costly and possibly unsafe.

Thus, the present invention presents a uniquely effective alternative. The employment of compensated beam motion and long shutter-opening intervals results in delivery of maximal energy from a given source to localized character exposure areas of the sensitive medium while the smearing effects due to motion are either curtailed or eliminated entirely.

For highest quality reproduction the motion compensation control elements 13, 15, 6 in a printing system of this kind should be adapted to match the angle function $A_2$ as closely as possible to the complementary function $A_1$ in the manner suggested in FIGS. 2 and 3. For this purpose the controls 15 ideally would be provided with a sawtooth voltage-generating circuit having a voltage output with accurately maintained timing and slope characteristics. The device 6 should have linear response to the sawtooth voltage in its refractive output effect. The above-mentioned KDP crystal material is well suited to this purpose.

As a reasonable expedient however a simple sine wave generating circuit coupled to such crystals would produce the angle function $A_2$ of FIG. 5 and thereby curtail smearing motion of the beam during considerably lengthened exposure intervals. Also, since the exposure interval may be lengthened with such compensation the energy delivered to the medium (or image definition) may be considerably enhanced.

It may be appreciated that the motion compensation arrangement of FIG. 1 is also applicable in systems employing slowly swept laser beams to form printed circuit devices. In this type of application the light input to shutter 4 is the image of the pattern to be reproduced, in discrete segments, and the surface 5 exposed to the deflected and modulated beam is coated with a photoresist material requiring intense exposure to light to produce the change in state by which a differential hardening of its grains or constituents occurs, and whereby the image may be developed by etching of the surface and substrate. Thus as the beam deflects slowly over the sensitive surface in coordination with the shutter segment exposures the compensating deflections of the present invention implemented in coordination with the mirror or other reflector motion exposes the desired conductive pattern on the surface of the device with improved resolution and definition.

In this type of application it would be feasible, in view of the slow motion of the reflector system, to compensate for other aspects of motion of the beam besides the motion caused by the deflection system. For example, it may be desired to compensate for randomly occurring beam motion caused by electrical noise in the motor drive of the mechanism producing the long deflection, or by external phenomena such as earth tremors, room or building vibrations, air-conditioning unit vibrations, and so forth. To compensate for such random motion it would be necessary to apply compensating refracting voltages to the device 6 which would instantaneously complement and thereby counteract the random aspect of motion of the beam.

Motion-sensing and signal-producing circuits suitable to the last purpose are available from the highly developed position control arts. The motion sensors must of course discriminate between the normal motion of the inertial deflecting system and the more rapid movements caused by noise. Such discriminatory sensing is readily provided by those skilled in the relevant art through use of conventional high-pass filter circuits, and will not be discussed further.

The same principles of compensation may be applied to segmented image displays based on illumination of a luminescent screen with a laser or other light beam forming an image in segments coordinated with a moving reflector mechanism. Such a system could have slower reflector motion than the above-described nonimpact printing system but in all other respects the problems incidental to intensifying the projected image while lessening smearing are essentially the same.

It will also be appreciated that where the surface 5 contains a printed circuit blank or display viewing screen which cannot be curved to maintain sharp focusing of the light beam at the surface throughout the deflection range it would be advisable to modify the optics of the system to provide conformed focusing. This aspect of the optics however would form no part of the present invention and is not considered further herein.

All of the foregoing applications involve the common feature of electro-optic compensation for motion of a moving reflector or other light transfer mechanism during periods of exposure of segments of an image. The compensating motion of the beam is generally in a direction opposite to the direction of movement of the reflector mechanism and is designed to cancel or reduce the motion of the reflected or otherwise transferred exposed image segment relative to the sensitive surface on which the image is being formed.

Figure 11:
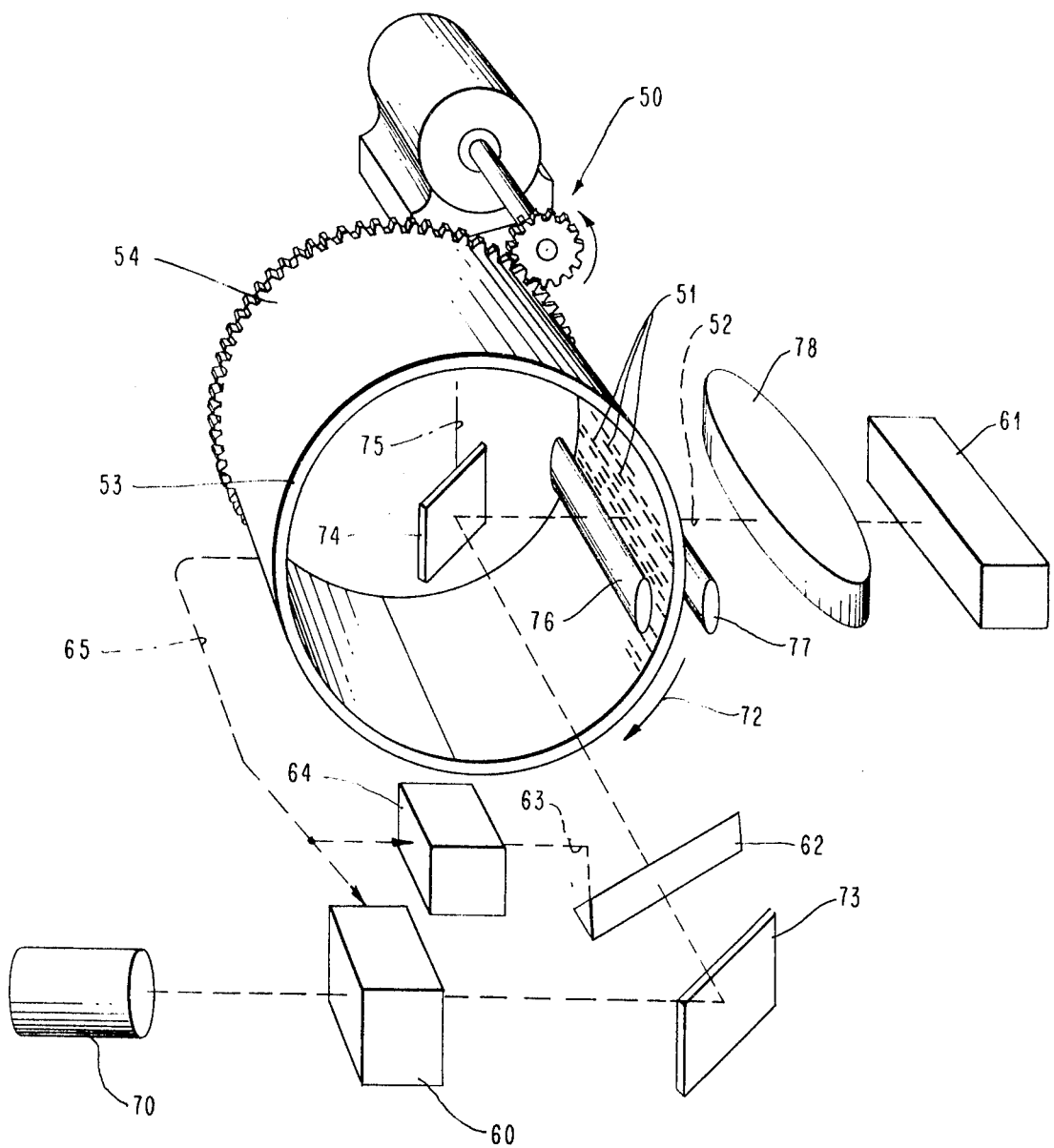
FIG. 11 is a schematic illustrating a second system embodiment of the invention.

We now turn with reference to FIG. 11 to a slightly different motion-compensating embodiment of the invention in which the moving elements 50 include closely spaced discrete hologram records 51 or the like which are sensed by transfer of a light beam 52 at a predetermined angle through the surface 53 of the record medium 54. It is essential to maintain precise angular positioning of the light beam 52 in relation to each discrete record datum or other image to be sensed. Hence if member 54 is required to travel at extremely high speeds in order to provide, for example, high rates of data input to a modern data-processing system, the time for exposure of a datum image is necessarily brief and extreme sampling time restrictions must be placed upon the timing and operation of the electro-optic shutter device 60 and the image detection system 61.

It is therefore quite effective and expedient to ease such restrictions by using beam motion compensation to cause the beam to track each datum over small increments of displacement. This may be accomplished by an electro-optic cell such as that shown at 62 which is supplied with a sawtooth or sinusoidal control signal 63 as previously discussed from a source 64 coordinated with the motion of member 54, the coordination being suggested by broken lines 65. Then as the beam of light is transferred from laser source 70, through shutter 60, cell 62 and medium 53, to detector 61, the beam 52 may be briefly deflected to track each record datum in the direction 72 of record movement so as to maintain briefly the relative positions of the beam and datum for small increments of record displacement, and thereby enable the shutter operating period to be lengthened. As shown in the drawing mirrors 73 and 74 are appropriately positioned to direct the light 52 from source 70 through cell 62 and record member 54. Mirror 73 may be stationary and mirror 74 may be adapted to be rotated about an axis 75 perpendicular to the axis of the cylinder 54, whereby the beam may be directed to different tracks of records on the cylinder surface. Lenses 76, 77, and 78 are used to direct the light to fall at appropriate angles on the record images 51 and to focus sharply on detector 61. The lens 76 should be adapted to cooperate with the compensating cell to maintain the angle of incidence of the beam on surface 51 throughout the compensating displacement.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In an optical system in which a beam of intense light modulated by segments of a discretely segmented image is transferred intermittently to a sensitive surface, the improvement comprising:
   first means adapted to operate in coordination with the modulation of said light beam to movably position said beam of light relative to said surface in long increments of displacement, whereby said image is segmentally reproduced at said surface with said segments correctly positioned relative to each other, said first means having inertia; and
   second means cooperative with said first means for producing short counterdisplacements of said beam relative to said first means, said short counterdisplacements operating to curtail relative motion between the beam and said surface during intervals of image segment exposure, whereby images of improved quality are formed at said surface with a predetermined light source and predetermined segment exposure timing period.

2. In an optical system for utilizing a mechanically swept laser beam to reproduce an image upon a sensitive surface, by projecting said image in a series of discrete image segments coordinated with the mechanical sweeping of the beam, the improved combination of:
   shutter means for intermittently exposing said receiving device to said beam in coordination with the sweep displacement to form faithfully positioned reproductions of said discrete image segments upon said surface;
   means for producing short counterdeflections of said beam proportionate to short segments of the sweep deflection during exposures of respective said image segments by said shutter means; and
   means for coordinating the duration and timing of operations of the shutter means and short counterdeflection producing means with said sweep deflections in order to provide segmental motion-cancelling effects improving the quality of said reproduced image obtained from a laser beam source of predetermined power rating operating with a segment shutter period of predetermined duration.

3. In a high-speed nonimpact printing system, involving intermittent exposure of a surface of a sensitive photographic medium for brief periods of time to a highly intense and concentrated beam of laser light, each exposure forming a developable impression in said medium of a segment of an image which is to be reproduced in entirety upon said medium, the improvement comprising:
   means adapted to be operated with inertia in coordination with a group of said image segment exposures for producing relative motion between said beam and said medium in long increments of displacement, each long increment effectively serving to expose said medium to the corresponding group of segments in the order of their positions in the original image; and
   means adapted to be operated essentially without inertia in coordination with said last-mentioned means for producing short increments of counterdisplacement of said beam relative to said first means proportionate in peak amplitude to durations of respective said image segment exposures and essentially coinciding with said segment exposures, whereby relative motion between said beam and said medium is curtailed during said exposures.

4. The improved nonimpact printing system of claim 3 wherein:
   said means adapted to be operated with inertia is a multifaceted mirror rotating at high speed and reflecting said beam to said medium, said rotating motion of said mirror producing said long increments of displacement of said beam.

5. The improved nonimpact printing system of claim 3 wherein:
   said means adapted to be operated without inertia includes:
      a variable refractive device subject to electrical control which is positioned to intercept and refract said beam and which is adapted to provide as output a refractive counterdisplacement of the beam varying as a linear function of a controlling electrical signal input; and
      means coupled to said means adapted to be operated with inertia for developing a varying control signal input for said refractive device, said signal having amplitude peaks proportional to the time durations of image segment exposure intervals and having periods of effectiveness coordinated with said segment exposures.

6. The system of claim 5 wherein:
   said control voltage is varied linearly in an essentially sawtooth pattern.

7. The system of claim 5 wherein:
   said control voltage is varied in a sinusoidal pattern.

8. The system of claim 6 including:
   shutter means operated by electrical enabling impulses to control the durations of individual said image segment exposures; and
   means supplying said enabling impulses to said shutter means, said supplying means developing said impulses in coordination with said control voltage developing means, said enabling impulses having durations proportional to said amplitude peaks of said controlling voltage.

9. In apparatus for constructing printed circuit devices by slow mechanical deflection of an intense image modulated laser beam relative to a surface of material coated with a layer of a photoresist preparation the improvement comprising:
   means coordinated with the said slow deflection for producing short counterdeflections of said beam electro-optically in order to nullify aspects of beam motion relative to said surface which would tend otherwise to distort the reproduced image; and
   shutter means operated in coordination with said short counterdeflection-producing means for controlling intermittent exposure of said medium to said deflecting beam, said shutter means providing exposure intervals proportional in duration to the counterdisplacement excursions of said beam.

10. In optical display apparatus employing mechanical deflection of an image segment modulated light beam to faithfully reproduce segmented images on a viewing screen the improvement comprising:
   an electro-optic device having variable refractive index interposed between the light beam and said screen;
   means coordinated with said mechanical deflection for developing a control voltage for said device, said voltage having an amplitude varying linearly in proportion to the instantaneous phase of exposure of the image segment currently being reproduced;
   means for applying said control voltage to said device to produce short counterdeflections of said beam substantially nullifying any motion of said beam relative to said screen during each image segment exposure;
   shutter means operated electrically for controlling the durations of said image segment exposures; and means coordinated with said control voltage producing means for developing and applying electrical control pulses to said shutter means, said pulses having durations proportional to respective peak amplitudes of said cell control voltage.

11. In optical readout apparatus including a continuously moving medium containing a plurality of discrete closely spaced hologram records, a beam of light modulated by the moving records on said medium and a detector for sensing the modulated light, the improvement comprising:
- a source of electrical signals coordinated with discrete record intervals of movement of said medium;
- a stationary electro-optic device positioned to intercept the light beam before it reaches said medium and responsive to said signals to deflect said beam through small compensational increments of deflection in said record intervals of movement in order to maintain the relative positions of said beam and individual said hologram records during the sensing of each record.

12. The improved readout apparatus of claim 11 wherein said device is a prism made of KDP crystal with electrodes affixed to its surface and said means is adapted to apply varying voltages to said electrodes.

13. The apparatus of claim 12 wherein said voltages vary in a sawtooth pattern.

14. The apparatus of claim 12 wherein said voltages vary in a sinusoidal pattern.

15. In an optical system containing a projected beam of light and a relatively moving part controlling projection of the light beam the improvement comprising:
- a static electro-optic refraction element containing no moving parts;
- electrodes connected to said element for controlling a refraction property thereof by electrical signals;
- means directing said light beam to pass through said element subject to refraction in accordance with said controlled refraction property;
- means coupled to said light beam controlling moving part for producing discrete electrical compensation control signals coordinated with discrete increments of motion of said parts;
- means for applying said control signals to said electrodes to nullify a distortional effect associated with the motion of said moving part relative to said light beam.

* * * * *